(12) United States Patent
Thubert et al.

(10) Patent No.: US 11,196,588 B2
(45) Date of Patent: Dec. 7, 2021

(54) REDUNDANT MULTICAST TREE IN A FAT TREE NETWORK TOPOLOGY

(71) Applicant: Cisco Technology, Inc., San Jose, CA (US)

(72) Inventors: Pascal Thubert, Roquefort les Pins (FR); Ramakrishnan Chokkanathapuram Sundaram, Fremont, CA (US); Patrick Wetterwald, Mouans Sartoux (FR); Eric Michel Levy-Abegnoli, Valbonne (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 105 days.

(21) Appl. No.: 16/585,839

(22) Filed: Sep. 27, 2019

(65) Prior Publication Data

US 2020/0259678 A1 Aug. 13, 2020

Related U.S. Application Data

(60) Provisional application No. 62/804,407, filed on Feb. 12, 2019.

(51) Int. Cl.
*H04L 12/44* (2006.01)
*H04L 12/18* (2006.01)
(Continued)

(52) U.S. Cl.
CPC .............. *H04L 12/44* (2013.01); *H04L 12/18* (2013.01); *H04L 12/184* (2013.01);
(Continued)

(58) Field of Classification Search
None
See application file for complete search history.

(56) References Cited

U.S. PATENT DOCUMENTS 9,210,071 B2 12/2015 Allan et al.
9,369,376 B2 6/2016 Yuan et al.
(Continued)

FOREIGN PATENT DOCUMENTS

CN 106330730 A 1/2017

OTHER PUBLICATIONS

The RIFT Authors, "RIFT: Routing in Fat Trees", RIFT Working Group, Internet Draft, Oct. 19, 2018, [online], [retrieved on Sep. 12, 2019]. Retrieved from the Internet: URL: <https://tools.ietf.org/pdf/draft-ietf-rift-rift-03.pdf>, pp. 1-113.

(Continued)

*Primary Examiner* — Ruihua Zhang
(74) *Attorney, Agent, or Firm* — Leon R. Turkevich

(57) ABSTRACT

A method includes identifying within a network topology, by an apparatus, a plurality of network devices; and establishing by the apparatus, a multiple tree topology comprising a first multicast tree and a second multicast tree, the first and second multicast trees operable as redundant trees for multicast traffic in the network topology, the establishing including: allocating a first of the network devices as a corresponding root of the first multicast tree, allocating a first group of intermediate devices from the network devices as first forwarding devices in the first multicast tree, allocating a second group of intermediate devices as belonging to first leaf devices in the first multicast tree, and allocating terminal devices of the network devices as belonging to the first leaf devices, and allocating a second of the network devices as the corresponding root of the second multicast tree, allocating the second group of intermediate devices as second forwarding devices in the second multicast tree, allocating the first group of intermediate devices as belonging to second leaf devices in the second multicast tree, and allocating the terminal devices as belonging to the second leaf devices.

20 Claims, 12 Drawing Sheets

(51) Int. Cl.
  H04L 29/06    (2006.01)
  H04L 12/46    (2006.01)
  H04L 12/28    (2006.01)
  H04L 12/64    (2006.01)
  H04L 12/751   (2013.01)
  H04L 12/721   (2013.01)

(52) U.S. Cl.
  CPC ...... H04L 12/2859 (2013.01); H04L 12/4633 (2013.01); H04L 12/4641 (2013.01); H04L 12/6402 (2013.01); H04L 45/02 (2013.01); H04L 45/32 (2013.01); H04L 69/14 (2013.01)

(56) References Cited

U.S. PATENT DOCUMENTS

| | | | |
|---|---|---|---|
| 9,419,811 | B2 | 8/2016 | Dong et al. |
| 10,389,173 | B2 | 8/2019 | Seewald et al. |
| 2017/0302464 | A1 | 10/2017 | Hu et al. |
| 2019/0379582 | A1* | 12/2019 | Johnsen ................ H04L 45/245 |

OTHER PUBLICATIONS

Li, Ed., et al., "Dynamic Flooding on Dense Graphs", Internet Engineering Task Force, Internet Draft, Dec. 3, 2018, [online], [retrieved on Sep. 12, 2019]. Retrieved from the Internet: URL: <https://tools.ietf.org/pdf/draft-li-lsr-dynamic-flooding-02.pdf>, pp. 1-37.

Handley et al., "Bidirectional Protocol Independent Multicast (BIDIR-PIM)", Network Working Group, Request for Comments: 5015, Oct. 2007, pp. 1-43.

Atlas et al., "An Architecture for IP/LDP Fast Reroute Using Maximally Redundant Trees (MRT-FRR)", Internet Engineering Task Force (IETF), Request for Comments: 7812, Jun. 2016, pp. 1-44.

Przygienda, Ed., et al., "RIFT: Routing in Fat Trees", RIFT Working Group, Internet-Draft, Apr. 26, 2018, [online], [retrieved on Jul. 24, 2019]. Retrieved from the Internet: URL: <https://tools.ietf.org/id/draft-ietf-rift-rift-01.pdf>, pp. 1-49.

Wikipedia, "Protocol Independent Multicast", Dec. 27, 2017, [online], [retrieved on Sep. 16, 2019]. Retrieved from the Internet: URL: <https://en.wikipedia.org/w/index.php?title=Protocol_Independent_Multicast&printable=yes>, pp. 1-5.

* cited by examiner

US 11,196,588 B2

REDUNDANT MULTICAST TREE IN A FAT TREE NETWORK TOPOLOGY

This application claims priority to Provisional Application No. 62/804,407, filed Feb. 12, 2019.

TECHNICAL FIELD

The present disclosure generally relates to a redundant multicast tree in a fat tree network topology.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Modern electrical substations are using IEC standard 61850 for data modeling and interconnection of Intelligent Electrical Devices (IEDs) that perform huge computations to manage the generation, transport and distribution of the energy.

An issue in such systems is how to support multicast and broadcast. Two redundant trees can be built for reliable multicast. One way of building those trees may be to leverage MRT (maximally redundant tree) according to the Internet Engineering Task Force (IETF) Request for Comments (RFC) 7812. MRT-FRR creates two alternate forwarding trees that are distinct from the primary next-hop forwarding used during stable operation. These two trees are maximally diverse from each other, providing link and node protection for 100% of paths and failures as long as the failure does not cut the network into multiple pieces.

However, the problem remains that the design and installation of a source tree for every possible multicast group from every possible source is not scalable; hence, there is a need for an optimization resembling a VxLAN ingress endpoint and yet can leverage an underlay multicast in a network utilizing a fat tree topology.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
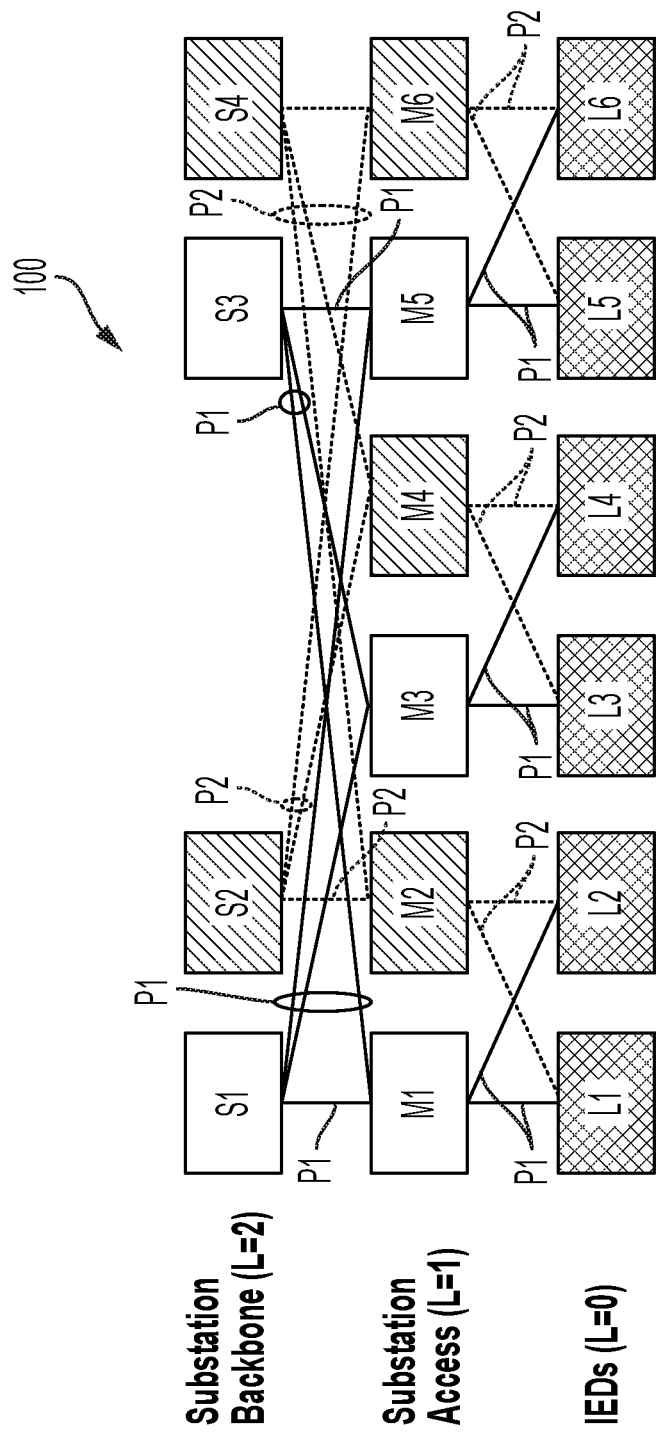
FIG. 1 illustrates a multiplane fat tree topology with redundant planes, according to an example embodiment.

In one embodiment, a method comprises identifying within a network topology, by an apparatus, a plurality of network devices; and establishing by the apparatus, a multiple tree topology comprising a first multicast tree and a second multicast tree, the first and second multicast trees operable as redundant trees for multicast traffic in the network topology, the establishing including: allocating a first of the network devices as a corresponding root of the first multicast tree, allocating a first group of intermediate devices from the network devices as first forwarding devices in the first multicast tree, allocating a second group of intermediate devices as belonging to first leaf devices in the first multicast tree, and allocating terminal devices of the network devices as belonging to the first leaf devices, and allocating a second of the network devices as the corresponding root of the second multicast tree, allocating the second group of intermediate devices as second forwarding devices in the second multicast tree, allocating the first group of intermediate devices as belonging to second leaf devices in the second multicast tree, and allocating the terminal devices as belonging to the second leaf devices.

In another embodiment, an apparatus is implemented as a physical machine, the apparatus comprising: non-transitory machine readable media configured for storing executable machine readable code; a device interface circuit configured for communications in a data network; and a processor circuit. The processor circuit is configured for executing the machine readable code, and when executing the machine readable code operable for: identifying within a network topology of the data network a plurality of network devices; and establishing a multiple tree topology comprising a first multicast tree and a second multicast tree, the first and second multicast trees operable as redundant trees for multicast traffic in the network topology. The establishing of the multiple tree topology comprises: allocating a first of the network devices as a corresponding root of the first multicast tree, allocating a first group of intermediate devices from the network devices as first forwarding devices in the first multicast tree, allocating a second group of intermediate devices as belonging to first leaf devices in the first multicast tree, and allocating terminal devices of the network devices as belonging to the first leaf devices, and allocating a second of the network devices as the corresponding root of the second multicast tree, allocating the second group of intermediate devices as second forwarding devices in the second multicast tree, allocating the first group of intermediate devices as belonging to second leaf devices in the second multicast tree, and allocating the terminal devices as belonging to the second leaf devices.

In another embodiment, one or more non-transitory tangible media is encoded with logic for execution by a machine and when executed by the machine operable for: identifying within a network topology, by the machine, a plurality of network devices; and establishing by the machine, a multiple tree topology comprising a first multicast tree and a second multicast tree, the first and second multicast trees operable as redundant trees for multicast traffic in the network topology, the establishing including: allocating a first of the network devices as a corresponding root of the first multicast tree, allocating a first group of intermediate devices from the network devices as first forwarding devices in the first multicast tree, allocating a second group of intermediate devices as belonging to first leaf devices in the first multicast tree, and allocating terminal devices of the network devices as belonging to the first leaf devices, and allocating a second of the network devices as the corresponding root of the second multicast tree, allocating the second group of intermediate devices as second forwarding devices in the second multicast tree, allocating the first group of intermediate devices as belonging to second leaf devices in the second multicast tree, and allocating the terminal devices as belonging to the second leaf devices

DETAILED DESCRIPTION

FIG. 1 illustrates a fat tree network topology (100 in the Figures) of physical network devices (e.g. in an Internet Protocol (IP) based network 100). Particular embodiments enable establishment of a multiplane fat tree (102 of FIG. 2) in the fat tree network topology 100 that can implement a substation network with redundant planes P1, P2 of multicast trees (e.g., "Black-T1" 104a and "Red-T2" 104b). Network devices are illustrated in the Figures as rectangles. The multiplane fat tree 102 established along the multiple planes P1, P2 within a fat tree topology 100 can establish an underlay fabric that can forward multicast packets via the redundant multicast trees 104 and 104b. The example embodiments can establish an overlay (e.g., an overlay of VxLAN tunnels 106 in FIG. 11) network and underlay (e.g., a tree technology) networks over a distributed cloud organized as Fat Tree underlays interconnected at Layer-3.

The particular embodiments can establish the multiplane fat tree 102 based on establishing that each node allocated as a relay node (i.e., forwarding device) in one multicast tree (e.g., multicast tree "T1" 104a) is allocated as a leaf node in the second multicast tree (e.g., multicast tree "T2" 104b). Hence, the redundancy at each level of a fat tree guarantees that the two multicast trees 104 do not share any common data link, such that each network device is guaranteed to receive a multicast packet via at least one of the multicast trees 104 despite any breakage of a data link in the fat tree network topology 100. Moreover, the redundant trees 104 can be deployed in a scalable manner in a large-scale fat tree network topology.

Modern International Electrotechnical Commission (IEC) standard 61850 based substations are using IEC standard 61850 for data modeling and interconnection of IEDs. IED stands for Intelligent Electrical Device and performs huge computations to manage the generation, transport and distribution of the energy. Generic Object Oriented Substation Event (GOOSE) and Sample Values (SV) traffic are multicast traffic with strong communication reliability requirements which means that redundancy mechanisms should be used. MMS is IP unicast and mainly used for command and control messages. Recent evolution in the deployment of IEC 61850 makes communication between substations a new requirement. Goose and Sample Values are communicated between IEC 61850 substations using Process bus and Station bus is based on to traffic separation.

The amount of traffic between IEDs could be huge and IEC 61850 recommends separating it between multicast domains. IEC 61850 substation communications are described in an "SCD" file. Using this file, a network administrator can "engineer" a communication network and define VLANs; however, reliance on a network administrator to engineer such a network using an SCD file can be relatively difficult and complex task to achieve and may take up to a month for a very large substation. The SV/Goose items are the number of multicast flows: one SV flow represents approximately a traffic of 6 Mbit/s.

Another important aspect is the communication reliability requirements. The 61850-90-4 technical report describes communication architecture based on Packet Redundancy Protocol (PRP) and High-Availability Seamless Redundancy (HSR) mechanisms. These are duplication and elimination mechanisms on two redundant networks.

Figure 2:
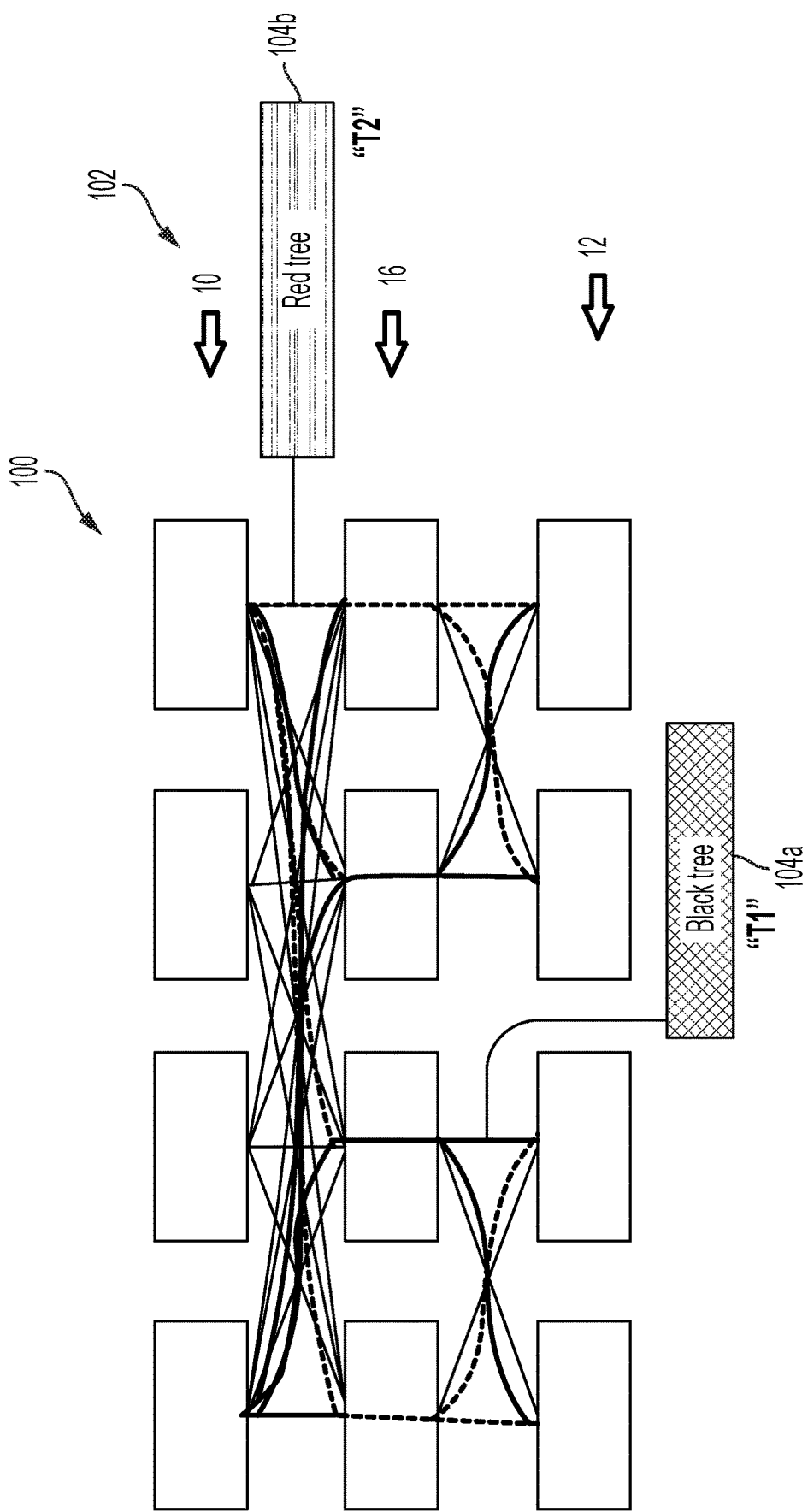
FIG. 2 illustrates creation of redundant multicast trees in a fat tree topology that covers all the leaf network devices, a spine and/or super spine, according to an example embodiment.
Figure 3:
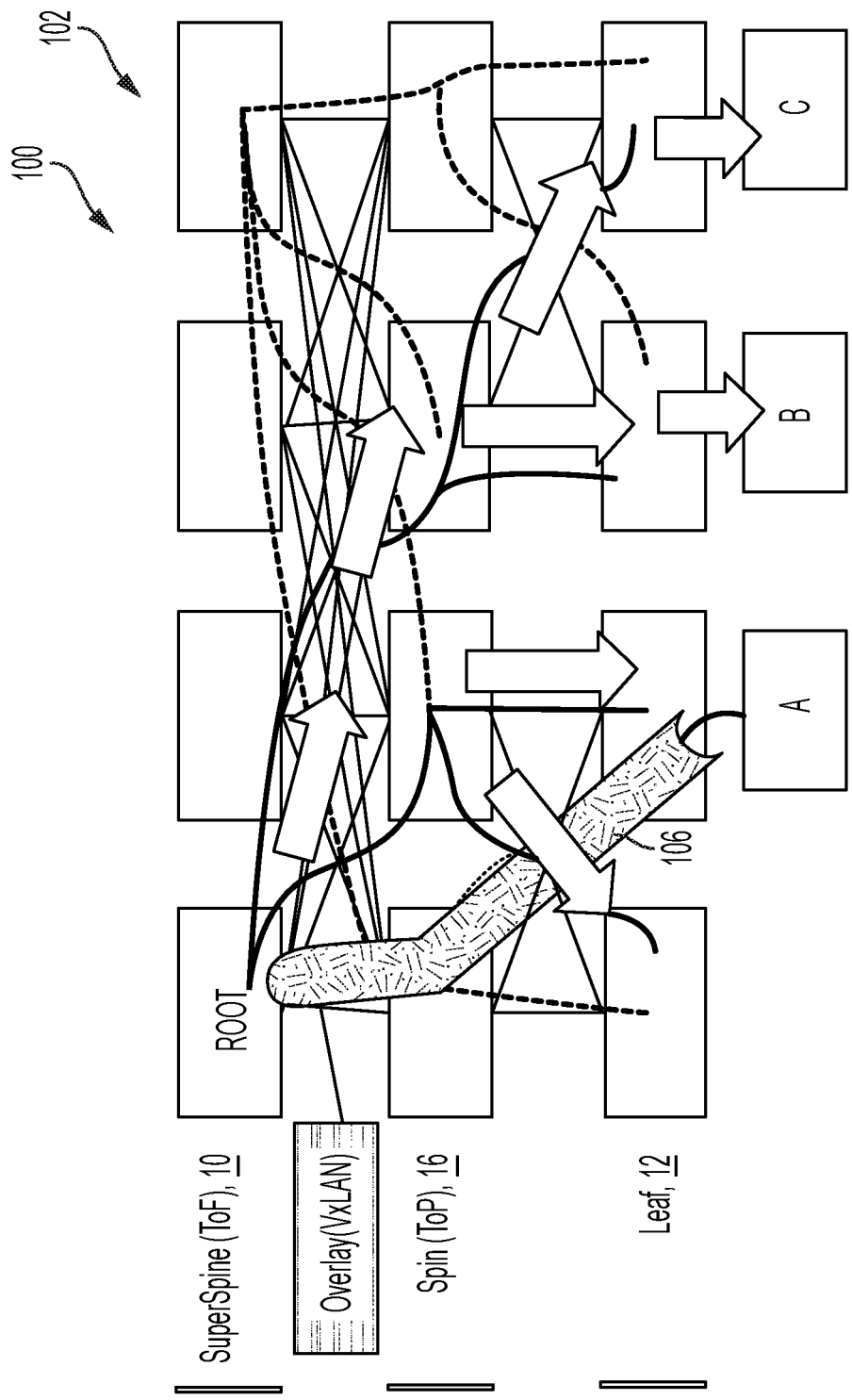
FIG. 3 illustrates creation of redundant multicast trees in a fat tree topology according to a proposal to a RIFT routing protocol, according to another example embodiment.
Figure 4:
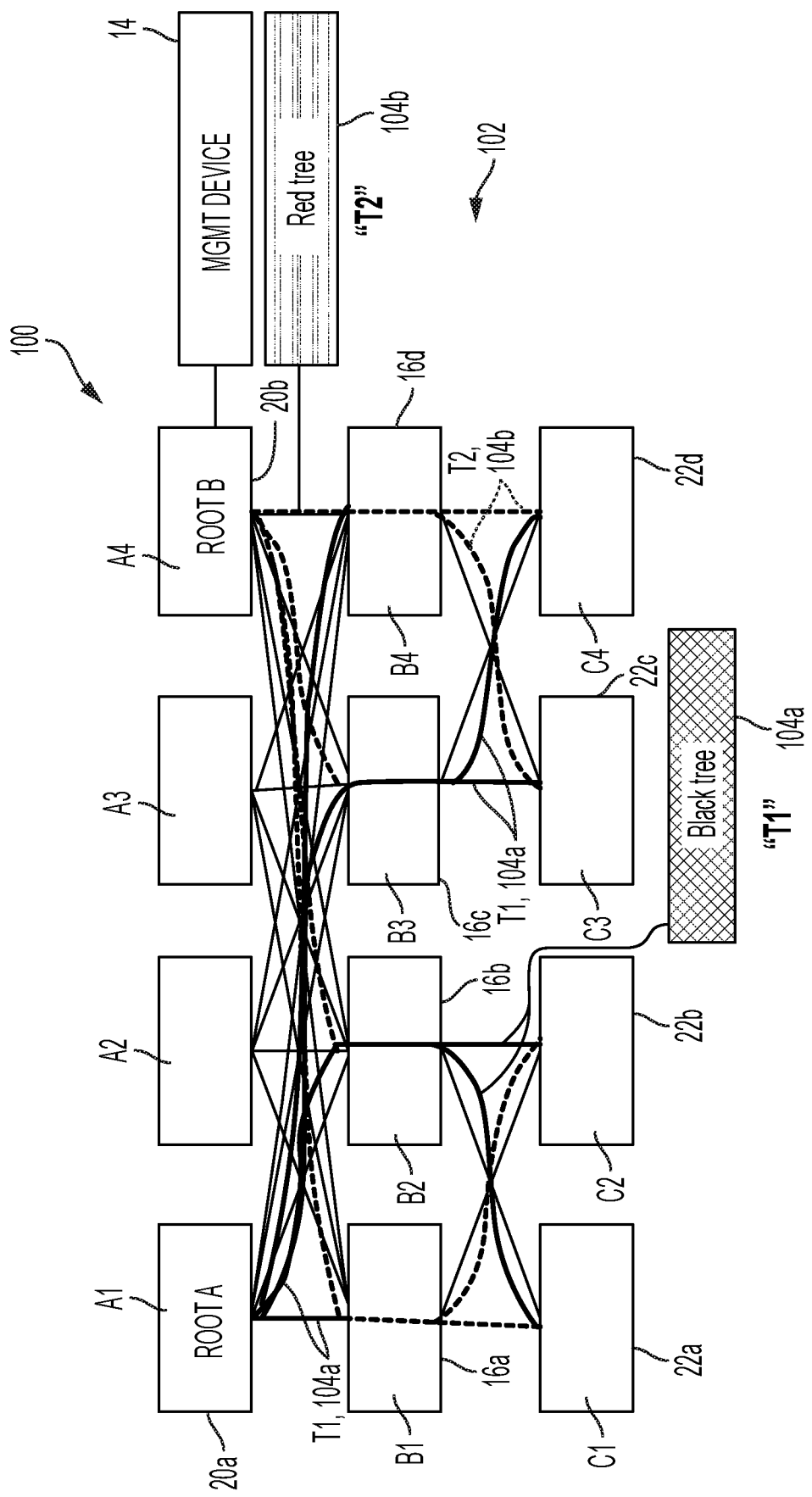
FIG. 4 illustrates an example embodiment that builds and selects redundant trees for the distribution of a multicast flow, according to an example embodiment.
Figure 5:
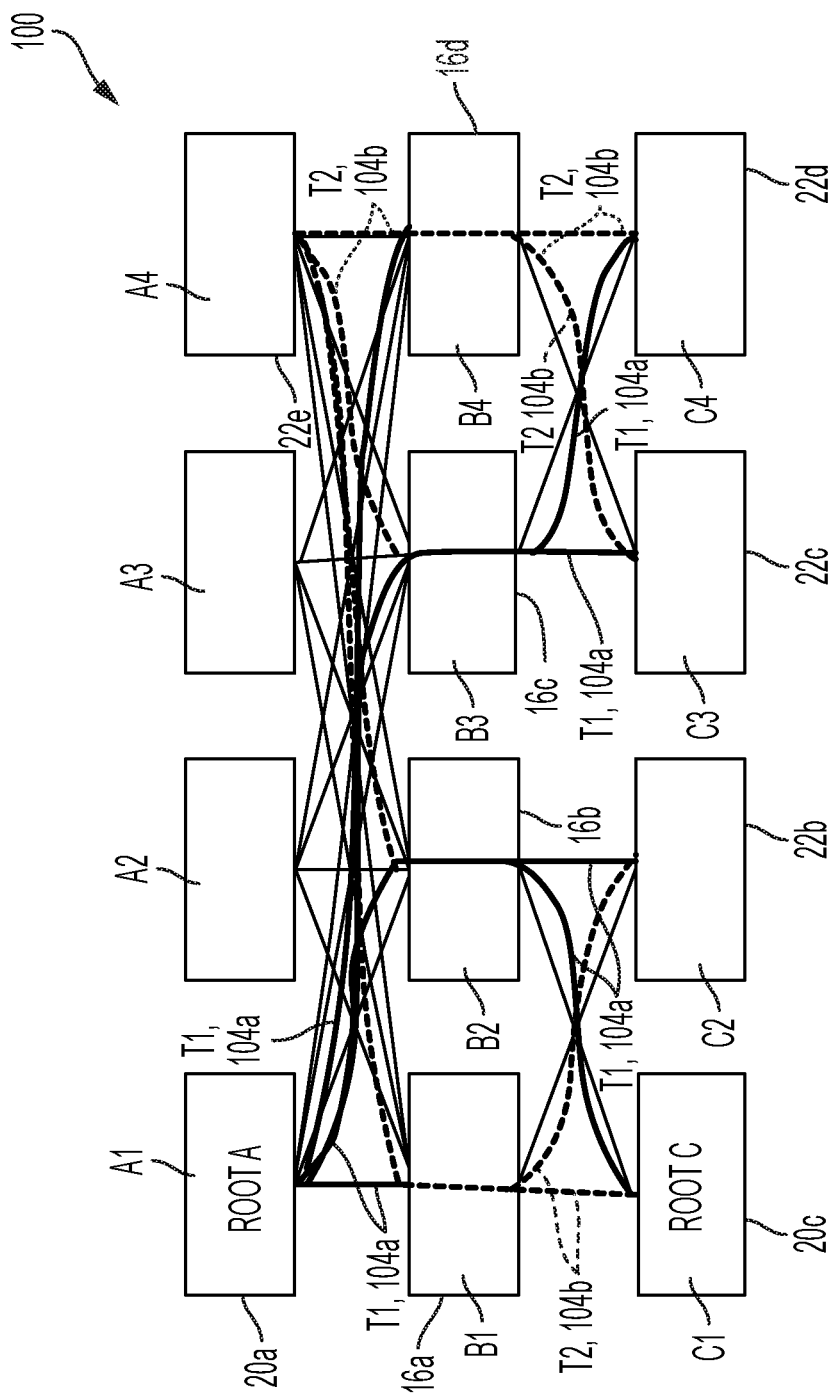
FIG. 5 illustrates a selecting a pair of trees to be used in the fabric for a particular multicast flow, according to an example embodiment.
Figure 6:
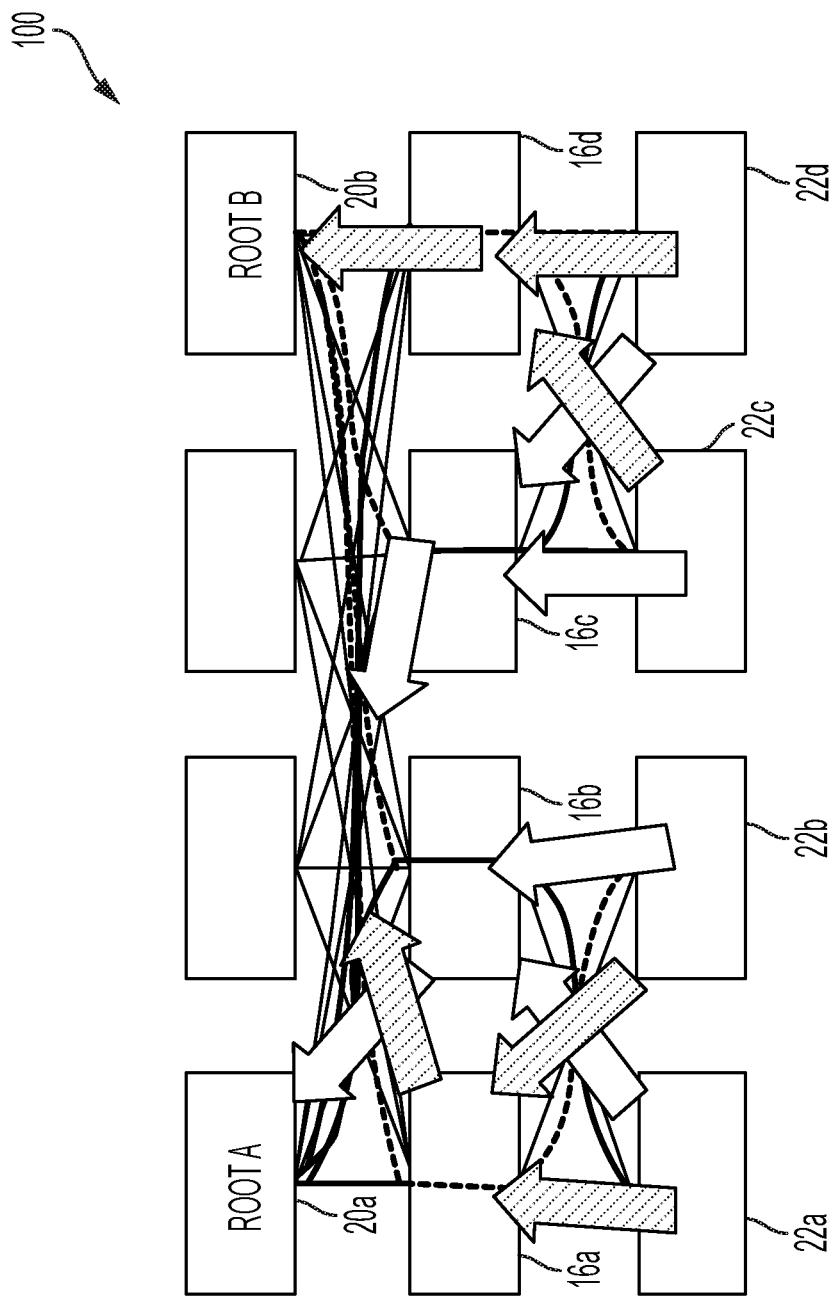
FIG. 6 illustrates flooding membership advertisements northwards toward roots of multicast trees, according to an example embodiment.

Hence, the example embodiments can cause creation of redundant multicast trees 104a, 104b in a fat tree network topology 100 that covers all the leaves (12 in FIGS. 2-3; 22 in FIGS. 4-6 and spine and super spine. A "Fat Tree" topology refers to a topology comprising multiple (e.g., one hundred or more) top-of-fabric (ToF) devices 10 and a substantially limited depth or "hops" between any ToF device 10 and any terminal leaf device 12; in other words, a "substantially limited depth" generally is limited to no more than a few hops (e.g., 2-4 hops) of intermediate network devices (also referred to as Top-of-Pod (ToP) devices) 16 between the ToF device 10 and a terminal device 12. The multicast trees 104a and 104b (e.g., the "black" and "red" tree) can be built downwards, in such a fashion that a Spine Node 16 is a relay node for one tree then it is an end node for the other.

FIG. 3 illustrates building the multiplane fat tree 102 in the fat tree network topology 100 based on a proposal to the RIFT routing protocol ("Routing in Fat Trees") (hereinafter the "RIFT proposal"), the RIFT routing protocol described in one example by the Internet Engineering Task Force (IETF) "RIFT" Working Group in the Internet Draft entitled "RIFT: Routing in Fat Trees" (draft-ietf-rift-rift-03). FIG. 3 illustrates that the multiplane fat tree 102 illustrated in FIG. 2 can distribute multicast flows injected at the lower level, which can be a generic leaf device, or an IED in a substation. In a generic network topology, the Root (rendezvous point) can be selected anywhere in the tree. In the RIFT proposal and in smartgrid stations, the roots can be chosen at the Superspine layer 10, and the trees can be oriented to flood downwards toward the leaf network devices 12. Multicast addresses can be injected like any routing prefix so as to use any tree (also referred to as "tree topology"), but the multicast flooding is controlled within the tree.

Multicast listener advertisements can be source-independent and flooded together with unicast destination advertisements; the difference is indicated by the type of address. For reference, multicast addresses can be in the range 224.0.0.0 through 239.255.255.255 for IPv4 and identified by the binary 11111111 at the start of the address with IPv6.

Source announcements can be signaled by mapping (S,G) in to new multicast prefix (*,G') and advertising it from the root ("S" refers to a source of multicast packets and "G" refers to the group "G", and "(*,G)" refers to all traffic to the group "G" regardless of the source). The mapped source announcements prefix (*,G') can be sent to the interested end points using the (*,G) tree that is built; hence, "G'" can be used to map to "(S, G')" such that "(S, G')" can be advertised in a unicast protocol. The "(*.*)" tree could also be used, if desired. The interested receivers can selectively join the (*,G') tree and receive the specific source stream (S,G).

As described in further detail below with respect to FIGS. 10A and 10B, multicast traffic injected in the fabric 100 can converge to the root ToF node 10 and is redistributed down along a tree rooted at the ToF node 10.

The tree can be established for that ToF Node and independent of the (S, G). A simple tree can be derived from the forwarding relays (FR) 16 by forming trees along the FR graph rooted at the Top-of-Pod (ToP) nodes 16, and joining them at with a super-root at the ToF devices 10. To achieve this, a terminal device 12 inside the fabric 100 can select as preferred parent the first FR 16 in its list as a feasible multicast parent. This is the parent with the most redundancy among the multicast capable ones. This election is indicated with the FR indication. As described in further detail below with respect to FIGS. 10A and 10B, a ToF device 10 can forward the multicast packets south to all connected ToP nodes. The packets can be then flooded down the preferred parent tree all the way to the leaves.

Any ToF node 10 that can reach all the leaves 12 can act as super-root of its own tree 104 and advertise (*,*). The result is a collection of super-trees that have different super-roots but share the same structure from the ToP down along the preferred parent trees.

A node (e.g., "C2" 12 in the Figures) inside the fabric 100 can use all of its feasible multicast parents for the northbound ECMP load balancing of northbound multicast packets, regardless of whether they are preferred parents or not.

Instead of limiting the forwarding south for multicast packets to the preferred parent tree, a parent in the fabric 100 can forward a multicast packet down to all the children that elected this parent as FR.

In one optional behavior, if there are few listeners and elephant flows, the listeners can be advertised using normal Topology Information Element (TIE) flooding. In that case, a packet is forwarded south only if that southern node advertised a listener in its Northbound TIEs (N-TIEs).

Alternatively, mice flows that have many listeners do not need to be injected in the routing. Those flows can be delivered to all leaves which filter based on their attached listeners. In this example of FIG. 3, the RIFT proposal can use the Flooding Relay (FR) selection and can attribute a "gender" (e.g., a tag or a "type") to two (2) of the Flooding Relays (FRs). It results that every node belongs to a "male" type and a "female" type tree, which are link disjoint, and may be node disjoint as well if the nodes (i.e., network devices) are attributed a gender.

Various options are available in FIG. 3: all network nodes (i.e., network devices) in FIG. 3 but the leaves can be given a gender or "color" during the ZTP phase; only Superspine (ToF) 10 nodes can be allocated a gender as part of the initial configuration (if there are planes then they are taken in different planes), e.g., only two of the ToF nodes are given a gender, or all of the Superspine (ToF) nodes are given a gender.

Multicast in FIG. 3 can use the FRs for the multicast operation as follows: if one of the parents do not have a gender, the child can assigns a gender and indicate the gender in the same message used to signal the role as FR. In that case the gender is per link and the trees are link-disjoint but not node-disjoint. If the parents have a gender, then the gender becomes a constraint in the FR selection algorithm, the child must select a male and a female parent among its FRs. In any fashion, the result is that there is a northbound link that is male and a northbound link that is female.

Recursively a same-gender path is established from each leaf to an ancestor ToF node of that gender, though the leaf is totally unaware of who that ancestor is. In the case where there is only one ToF Node with a gender, all the multicast traffic flows through that node and then south in the global same-gender tree. Conversely, there is a male (and respectively a female tree) spanning all the reachable leaves from every male (and respectively female) ToF nodes, respectively. The trees are link-disjoint. If all nodes have a gender, then the trees are also node disjoint.

As described below, a source can output copies of each multicast packets, tagged with a gender (male and female) or "color" ("black" or "red"), for flooding along the appropriate multicast tree 104 according to the gender or color. Multicast packets can be sent North to the same gender ToF Node, and then the ToF node sends it down the same gender tree; alternately, there can be multiple ToF nodes rooting a partial gender tree, and a multicast packet going north can be given to all of them by the ToP node for total distribution down the respective gender trees.

In an alternate variation of FIG. 3, a tunnel 106 such as a VxLAN encapsulation can be used for Northbound traffic (i.e., away from the leaf and toward a root). In that case the exact location of the root and whether there is only one root or multiple ones can be abstracted by the VxLAN itself, as illustrated in FIG. 3.

As described previously, two redundant trees can be built for reliable multicast: those two trees should have minimal reliance on common nodes (redundant, disjoint trees). One way of building those trees may be to leverage MRT per RFC 7812. MRT-FRR creates two alternate forwarding trees that are distinct from the primary next-hop forwarding used during stable operation. These two trees are maximally diverse from each other, providing link and node protection for 100% of paths and failures as long as the failure does not cut the network into multiple pieces.

Unlike the past problems of flooding in a complete bipartite graph such as a Clos or a fat trees topology, the example embodiments provide a specific method that applies in complete bipartite graphs. The example embodiments provide an efficient and simple technique whereby a node in one of the trees is a leaf on the other. Hence, a breakage cannot block transmission down both trees since the breakage hits a leaf of one of the trees. The example embodiments need not span the entire graph since the distribution of multicast data is typically only for the leaves, as opposed to the flooding of LSR such as discussed in Li et al.

FIG. 4 illustrates an example of one or more management devices 14 that builds and selects redundant trees having respective different roots 20 for the distribution of a multicast flow (e.g., a "black" tree 104*a* comprising a root network device 20*a* and a "red" tree 104*b* comprising a root network device 20*b*) in a Fat Tree topology 100. In particular, the network devices can be arranged by a processor circuit 42 (FIG. 8) of the management device 14 in operation 50 of FIG. 9A into a fat tree network topology 100 comprising a ToF device layer 10, a ToP device layer 16, and a terminal device layer 22.

The processor circuit 42 of the management device 14 (executing a map server/map resolver (MSMR)) can establish a terminal device 12 based on establishing the redundant multicast trees 104a and 104b in operation 52. In particular, the terminal device 12 in operation 52 can allocate a pair of trees 104a, 104b to be used in the fabric 100 for a particular multicast flow. The example of FIG. 4 is optimized for the Clos/Fat tree fabric design, and takes advantage of that particular design to provide reliable multicast in a cheap and efficient fashion.

The trees can cover all the leaves and spine and super spine, in a manner that an intermediate node (i.e., "top-of-pod" (ToP) device) 16 is a forwarder in one tree then it is a leaf 22 in the other. As illustrated in FIG. 4, the processor circuit 42 of the management device 14 in operation 54 can designate (i.e., allocate) the ToF device "A1" 10 as a root network device 20a for the multicast tree "T1" 104a; the management device 14 in operation 54 also can designate (i.e., allocate) the ToF device "A4" 10 as a root network device 20b for the multicast tree "T2" 104b for a given multicast group (e.g., "(*,G)").

The processor circuit 42 of the management device 14 in operation 56 can designate (i.e., allocate) the intermediate nodes "B2" 16b and "B3" 16c as first forwarding network devices in the "black" multicast tree "T1" 104a rooted by the root network device "A1" 20a; the processor circuit 42 of the management device 14 in operation 56 also can allocate the intermediate nodes "B1" 16a and "B4" 16d as first leaf devices in the "black" multicast tree "T1" 104a rooted by the root network device 20a.

The processor circuit 42 of the management device 14 in operation 58 can allocate the intermediate devices "B1" 16a and "B4" 16d as second forwarding network devices in the "red" multicast tree "T2" 104b rooted by the root network device "A4" 20b. The processor circuit 42 of the management device 14 in operation 58 also can allocate the intermediate nodes "B2" 16b and "B3" 16c as second leaf nodes in the "red" multicast tree "T2" 104b rooted by the root network device 20b. The management device 14 can allocate the terminal devices "C1" through "C4" as terminal devices, accordingly.

Figure 9A:
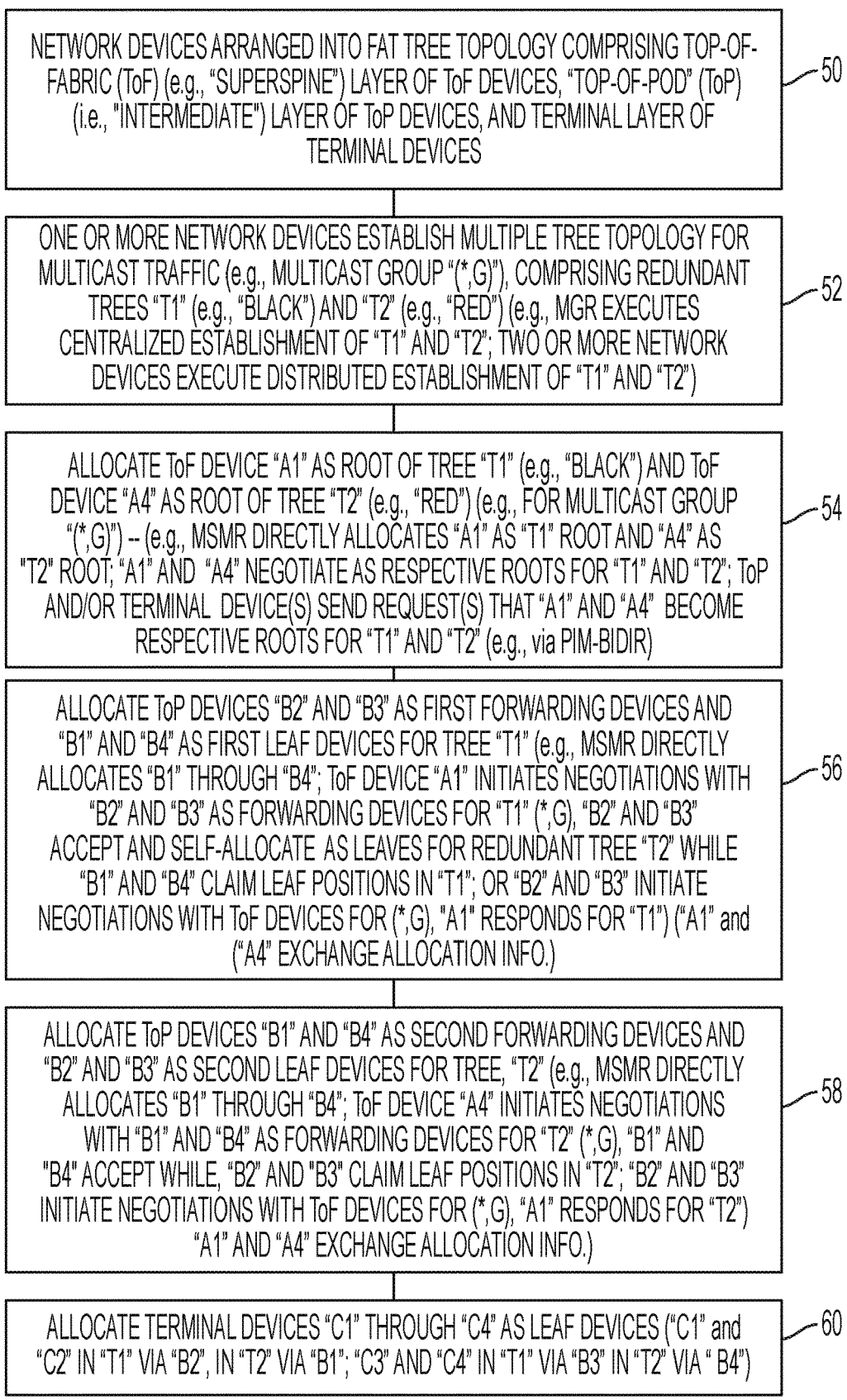
FIGS. 9A-9C illustrate an example method of deploying the redundant multicast trees in a fat tree topology for one or more multicast groups, according to an example embodiment.

Hence, the management device 14 in operations 50 through 60 in FIG. 9A can generate the "black" multicast tree 104a of FIG. 4 comprising the root network device "A1" 20a, the intermediate devices "B2" 16b and "B3" 16c as first forwarding network devices, and first leaf nodes "B1" 16a, "B4" 16d, "C1" 22a, "C2" 22b, "C3" 22c, and "C4" 22d. The management device 14 in operations 50 through 60 in FIG. 9A also can generate the "red" multicast tree "T2" 104b comprising the root network device "A4" 20b, the intermediate nodes "B1" 16a and "B4" 16d as second forwarding network devices, and second leaf nodes "B2" 16b, "B3" 16c, "C1" 22a, "C2" 22b, "C3" 22c, and "C4" 22d.

The end result is that a breakage cannot prevent the forwarding along at least one of the trees.

Hence the Superspine nodes 10 can indicate which spine nodes 16 are relay and which are end nodes (e.g., leaf nodes 22) for the trees that it sources. The relays can advertise the root and the tree down in the routing protocol whereas the end nodes do not. In the case of a Fat Tree (or a Clos Network), the trees can be built as illustrated in FIG. 4, where the management device 14 can build trees starting at the spine. As described previously, the relays (i.e., forwarding devices) are selected so that a node that is designated a relay in one multicast tree (e.g., 104a) is designated a leaf on the other tree (e.g., 104b).

FIG. 9A also illustrates that the multicast trees 104a and 104b can be built based on distributed processing by the network devices in the fat tree network topology 100, as opposed to centralized building by the management device 14. For example, a parent (self-selected, for example, in operation 52) can select a child in operation 54; if needed in the case where the fabric (e.g., the tree topology) is heavily damaged, a parent (e.g., "A1" 20a) can select in operation 56 a collection of children, so that a child can cover southbound connectivity to all the grand children in operation 60. The role of a child 16 covering for a grandchild 22 can be accepted by the child 16 in a transactional manner, so that the child (e.g., "B2" 16b in operation 56 and/or "B1" 16a in operation 58) can refuse to act as a relay for any other parent, e.g., "B2" 16b in operation 56 accepts "A1" 20a as parent but rejects "A4" 20b as parent, while "B1" 16a accepts "A4" 20b as parent but rejects "A1" 20a as parent. In an alternate variation, the child may accept more than one parent but then can marks the parent as as mutually exclusive for the distribution of the same multicast flow.

As apparent from FIG. 4, the multicast distribution trees 104a and 104b never use a common link data link (drawn as thin lines in FIG. 1), such that any breakage inside one tree can only harm a leaf of another non-mutually-exclusive tree, so a breakage cannot block forwarding on both trees selected for a given multicast flow.

In a RIFT proposal, the root of the tree can be the Superspine node from which the computation started. But for particular applications where all nodes are aware of the tree, any node may serve as root.

The map server/resolver (e.g., LISP) 14 managing the fabric 100 can be updated of the status of the trees 104, enabling the management device 14 to allocate the (pair of) trees to be used in the fabric for a particular multicast flow. Hence, the management device 14 can identify the multicast trees 104 as a response to a lookup request to resolve the VxLAN tunnel endpoint for a lookup of a multicast address. The map server/resolver can be implemented in the management device 14, multiple distributed management devices 14, etc.

FIG. 5 illustrates a variation of FIG. 4, where a management device (14 of FIG. 4) (executing a map server/map resolver (MSMR)) selecting a pair of trees to be used in the fabric for a particular multicast flow. In particular, the map server/map resolver (MSMR) (14 of FIG. 13) can select a root "A1" 20a, "C1" 20c in (each of) the tree(s) 104a, 104b and establish the roots "A1" 20a and/or "C1" 20c as VxLAN egress(es). In a Fat Tree, the root is typically a spine node (e.g. "A1" 20a for the "black" multicast tree "T1" 104a in FIG. 14 rooted by the upper left candidate root network device 20a) though it does not have to be (e.g., "C1" 20c for the "red" multicast tree "T2" 104b rooted by the lower left network device "C1" 20c). Hence, the "black" multicast tree "T1" 104a in FIG. 5 comprises the root "A1" 20a, the forwarding network devices "B2" 16b and "B3" 16c, and leaf devices "B1" 16a, "B4" 16d, "C2" 22b, "C3" 22c, "C4" 22d, and "A4" 22e; the "red" multicast tree "T2" 104b in FIG. 5 comprises the root "C1" 20c, the forwarding network devices "B1" 16a and "B4" 16d, and the leaf devices "B2" 16b, "B3" 16c, "C2" 22b, "C3" 22c, "C4" 22d, and "A4" 22e.

In another particular feature of the example embodiments, if there is one tree 104 and it is split in case of a breakage, then the MSMR (executed, for example, by the management device 14) may use the split tree as two (2) trees, and select a root in each one.

Forwarding packets along a tree requires the nodes to be aware of their neighbors. Hence, assuming in FIG. 9B that a multicast packet for a given multicast flow "(*,G)" (e.g., advertisement packet, data traffic packet, etc.) is injected into the fat tree network topology 100, the ToF devices 10 can share the multicast packet between each other in operation 62. Each ToF device allocated as a root for the given multicast flow "(*,G)" (e.g., "A1" 20*a* and "A4" 20*b* of FIG. 4) in operation 64 can copy all the neighbors that are part of the tree but the one from which the packet came. This creates an oriented distribution tree per root per tree, one black multicast tree "T1" 104*a* and one red multicast tree "T2" 104*b* illustrated in FIGS. 4, 5, 10A and 10B.

FIG. 6 illustrates leaf network devices 22 and intermediate network devices 16 flooding messages (e.g., multicast packets, membership advertisements, etc.) northwards toward the roots 20*a*, 20*b* of the multicast trees 104*a*, 104*b*.

Figure 9B:
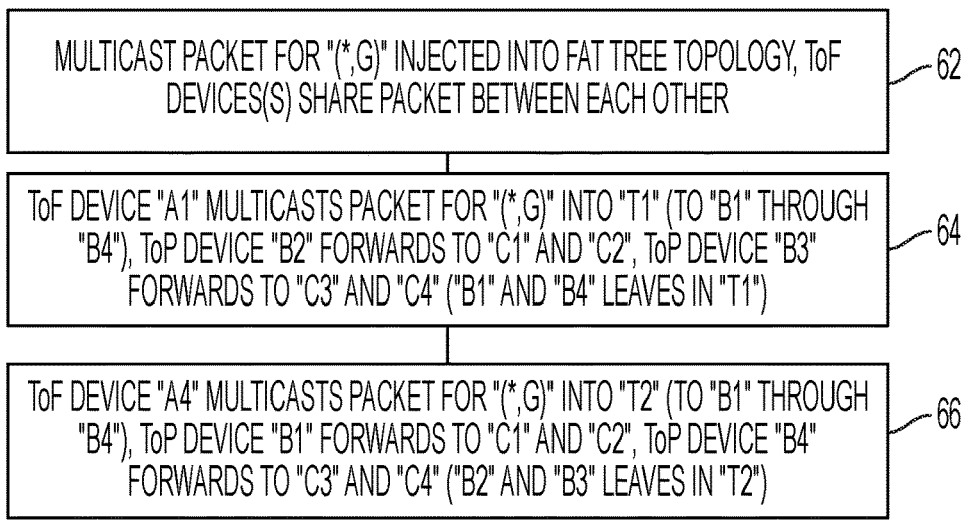
Figure 9C:
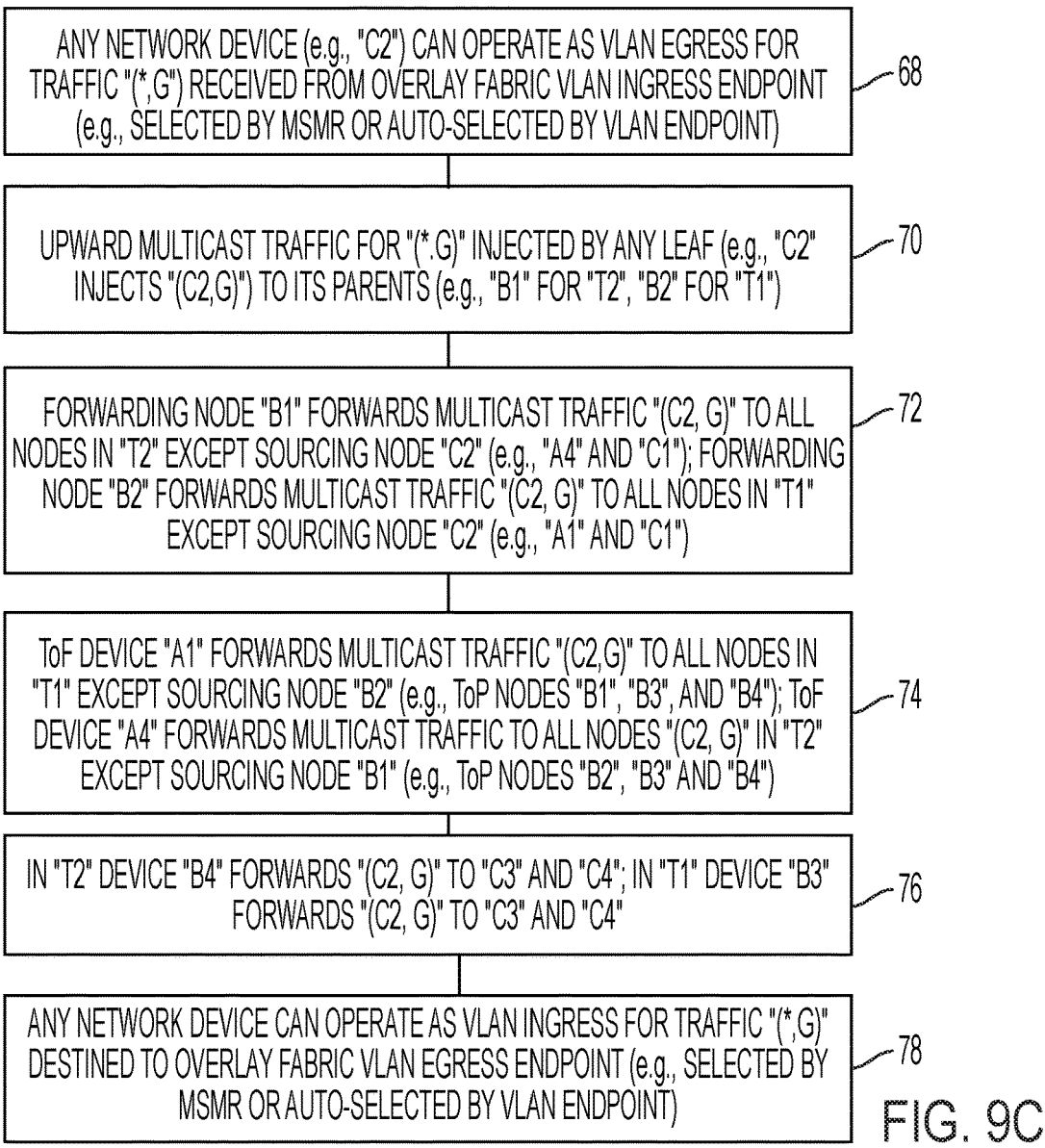

Hence, the ToF device "A1" 20*a* in operation 64 of FIG. 9B multicasts the packet for "(*,G)" into the multicast tree "T1" 104*a* (i.e., to the devices "B1" 16*a* through "B4" 16*d*). The ToP device "B2" 16*b* in operation 64 responds by forwarding the data packet to leaf devices "C1" 22*a* and "C2" 22*b*. The ToP device "B3" 16*c* in operation 64 responds by forwarding the data packet to leaf devices "C3" 22*c* and "C4" 22*d*. The devices "B1" 16*a* and "B4" 16*d* do not forward the received multicast data packet because they are leaves in the multicast tree "T1" 104*a*.

The ToF device "A4" 20*b* in operation 66 of FIG. 9B multicasts the data packet for "(*,G)" into the multicast tree "T2" 104*b* (i.e., to devices "B1" 16*a* through "B4" 16*d*). The ToP device "B1" 16*a* in operation 66 responds by forwarding the data packet to leaf devices "C1" 22*a* and "C2" 22*b*. The ToP device "B4" 16*d* responds by forwarding the data packet to leaf devices "C3" 22*c* and "C4" 22*d*. The devices "B2" 16*b* and "B3" 16*c* do not forward the received multicast data packet because they are leaves in the multicast tree "T2" 104*b*.

FIG. 6 illustrates leaf network devices 22 and intermediate network devices 16 flooding messages (e.g., multicast packets, membership advertisements, etc.) northwards toward the roots 20*a*, 20*b* of the multicast trees 104*a*, 104*b*. In some cases such as the RIFT proposal, the management device 14 can constrain membership flooding (northwards) to the multicast tree(s). But this option forces the nodes including the leaves to know which is the root (rendezvous point (RP)) and the associated rendezvous point address (RPA) for a particular multicast group so as to use the correct tree: the management device 14 can supply this information (e.g., RPA) each of the devices in the fat tree network topology 100 (including the leaves 22), causing the leaves 22 to identify the appropriate root 20 for a particular multicast group, thereby causing use of the correct tree 104. The RPA can be associated with a particular router device, or an address that is used in the fat tree network topology 100 and not bound to any particular network device (e.g., a virtualized address). The link that the RPA is referred as a Rendezvous Point Link (RPL), and can be a loopback or a network interface (e.g., a LAN interface). Hence, the information sent by a management device 14 and/or a root network device 20 can establish subtrees rooted at the RPL devices (e.g., routers on the Rendezvous Point Link), causing southwards devices to join the subtrees, and causing the RPL to join the subtrees into a tree. Consequently, upstream traffic toward the RPA eventually will arrive at the RPL devices 20.

For example, each of the network devices 16 and 22 can be configured for flooding multicast advertisement messages northward according to Bi-directional Protocol Independent Multicast (BIDIR-PIM) (i.e., PIM-BIDIR) according to the IETF Request for Comments 5015. Hence, the multicast advertisement messages used to generate the multicast tree "T1" 104*a* and/or the multicast tree "T2" 104*b* based on multicast advertisement messages from any network device, including a leaf device "C22" 22*b*, illustrated in FIGS. 10A and 10B, based on the rule that a message is forwarded to all available links except for the incoming link having supplied the message.

Figure 10A:
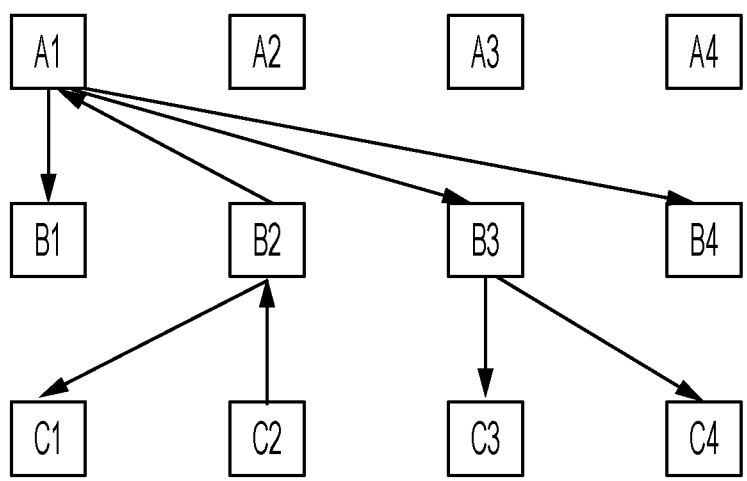
FIGS. 10A and 10B illustrate an example propagation of a multicast packet via the redundant multicast trees, according to an example embodiment.
Figure 10B:
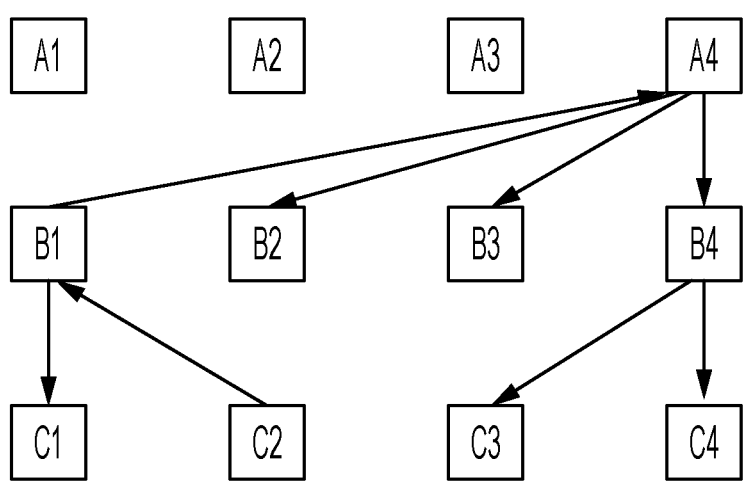

FIG. 10A illustrates a leaf device "C2" 22*b* multicasting in operation 70 a data packet (e.g., for "(*,G)") into the multicast tree "T1" 104*a*, and FIG. 10B illustrates the leaf device "C2" 22*b* multicasting in operation 70 the same data packet into the redundant multicast tree "T2" 104*b* of the fat tree network topology 100. For example, the leaf device "C22" 22*b* in operation 68 can be configured (e.g., dynamically by itself, another network device, and/or via allocation by the management device 14) as a VxLAN egress endpoint for a VxLAN tunnel 106 to another fat tree network topology 100*b* and/or 100*c*, illustrated in FIG. 11. A message output by the leaf device "C22" 22*b* in operation 70 along the multicast tree "T1" 104a in FIG. 10A is received by its parent "B2" 16*b*, and the same message output by the leaf device "C22" 22*b* in operation 70 along the multicast tree "T2" 104b in FIG. 10B is received by its parent "B1" 16*a*. Each forwarding network device "B2" 16*b* and "B1"16*a* in FIGS. 10A and 10B multicasts in operation 72 the data packet (e.g., for multicast traffic "(C2,G)") to each of its neighbors along the respective multicast trees 104*a* and 104*b*, except along the link having sent the data packet (i.e., back to the source leaf device "C22" 22*b*); hence, the forwarding network device "B1" 16a in FIG. 10B in operation 72 multicasts the data packet to the ToF device "A4" 20*b* and the leaf network device "C1" 22*a* in the multicast tree "T2" 104*b*, and the forwarding network device "B2" 16b in FIG. 10A in operation 72 multicasts the data packet to ToF device "A1" 20*a* and the leaf network device "C1" 22*a* in the multicast tree "T1" 104*a*. The forwarding network devices 16*a* and 16*b* also can flood the multicast data packet (in case of an advertisement message during distributed formation of the multicast trees 104) to peer intermediate network devices "B3" 16c and "B4" 16d, as appropriate.

Each ToF device "A1" 20a and "A4" 20b in operation 74 can multicast the received data packet (e.g., for multicast traffic "(C2,G)") to each of its neighbors along the associated multicast tree 104 (except for the source having transmitted the data packet), such that the ToF device "A1" 20a multicasts the data packet to ToP devices "B1" 16a, "B3" 16c, and "B4" 16d in the multicast tree "T1" 104a (and not the sourcing ToP device "B2" 16b), and the ToF device "A4" 20b multicasts the data packet to ToP devices "B2" 16b, "B3" 16c, and "B4" 16d in the multicast tree "T2" 104b (and not the sourcing ToP device "B1" 16a). ToF device "A1" 20a and "A4" 20b also can forward the data packet to peer ToF devices "A2" and "A3", as appropriate.

The ToP device "B4" 16*d* in operation 76 multicasts the received data packet (e.g., for multicast traffic "(C2,G)") to its children "C3" 22*c* and "C4" 22*d* in the multicast tree "T2" 104*b*, and the ToP device "B3" in operation 76 multicasts the received data packet to its children "C3" 22*c* and "C4" 22*d* in the multicast tree "T1" 104*a*. As described previously, the ToP devices "B1" 16*a* and "B4" 16*d* are leaf devices in the multicast tree "T1" 104*a* and do not forward the packet further in the multicast tree "T1" 104*a*, and the ToP devices "B2" 16*b* and "B3" 16*c* are leaf devices in the multicast tree "T2" 104*b* and do no forward the packet further in the multicast tree "T2" 104*b*.

Hence, the propagation of the multicast message throughout the redundant multicast trees 104 enables any network device in the fat tree network topology 100 to operate in operation 78 as a VLAN ingress endpoint for traffic "(*,G)" destined for an overlay fabric VLAN egress endpoint: the ingress endpoint can be selected by the management device 14 and/or auto-selected by the VLAN egress endpoint, as appropriate.

As apparent from the foregoing, the example embodiments enable deployment of multiple redundant multicast trees in a fat tree topology, also referred to as a "CLOS" topology, for reliable delivery of multicast traffic.

Figure 7:
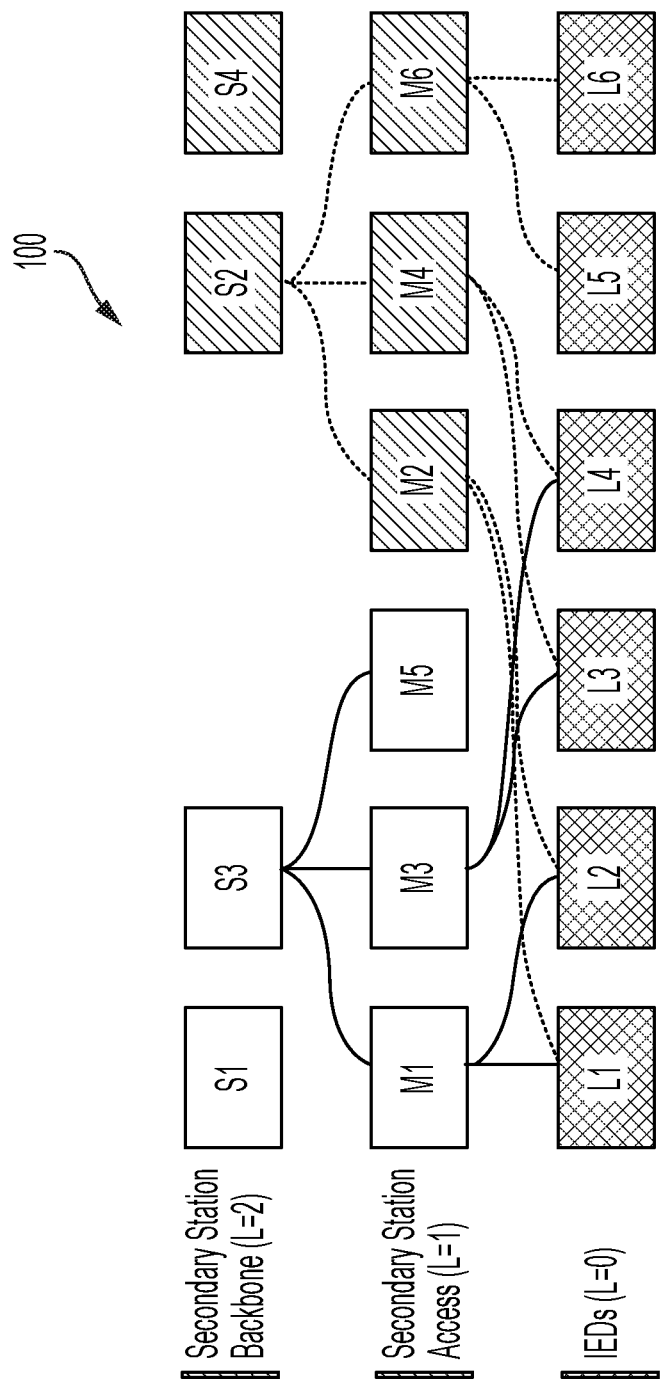
FIG. 7 illustrates computing multicast trees in different control planes, causing the multicast trees to be non congruent.

FIG. 7 illustrates the management device 14 applying multiple multicast trees to a secondary smart grid substation. In that case, a degenerate variation is proposed whereby a 2-planes canonical Clos is put together for the backbone and access layers, while the IEDs form a third layer. That third layer acts as leaves in this example. The planes are illustrated below as a blue (dark) and a red (shaded) plane, and the planes only meet at the level of the IEDs, since they are suited for end-to-end redundancy protocols such as PRP and HSR. Hence, FIG. 7 illustrates the management device computing the trees in different planes, which makes the trees non congruent by definition.

According to example embodiments, a management device can generate redundant multicast trees in a Fat Tree topology that covers all the leaves and possibly spine and super spine, in a manner that a node is a forwarder in one tree then it is a leaf in the other tree. Hence, a breakage cannot prevent the forwarding of a data packet along at least one of the trees.

Figure 8:
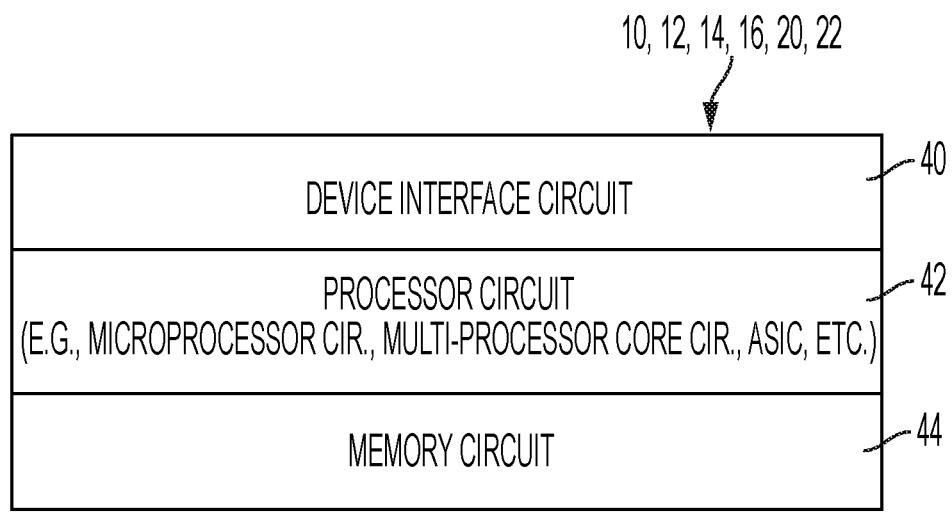
FIG. 8 illustrates an example implementation of any of the devices in the Figures, according to an example embodiment.

FIG. 8 illustrates an example implementation of any one of the network devices 10, 12, 14, 16, 20, and/or 22, according to an example embodiment. The apparatus 10, 12, 14, 16, 20, and/or 22 is a physical machine (i.e., a hardware device) configured for implementing network communications with other physical machines data network 10 illustrated in the Figures. The term "configured for" or "configured to" as used herein with respect to a specified operation refers to a device and/or machine that is physically constructed and arranged to perform the specified operation.

Each apparatus 10, 12, 14, 16, 20, and/or 22 can include a device interface circuit 40, a processor circuit 42, and a memory circuit 44. The device interface circuit 40 can include one or more distinct physical layer transceivers for communication with any one of the other devices 10, 12, 14, 16, 20, and/or 22; the device interface circuit 40 also can include an IEEE based Ethernet transceiver for communications with the devices of FIG. 1 via any type of data link (e.g., a wired or wireless link, an optical link, etc.). The processor circuit 42 can be configured for executing any of the operations described herein, and the memory circuit 44 can be configured for storing any data or data packets as described herein.

Any of the disclosed circuits of the devices 10, 12, 14, 16, 20, and/or 22 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Figure 11:
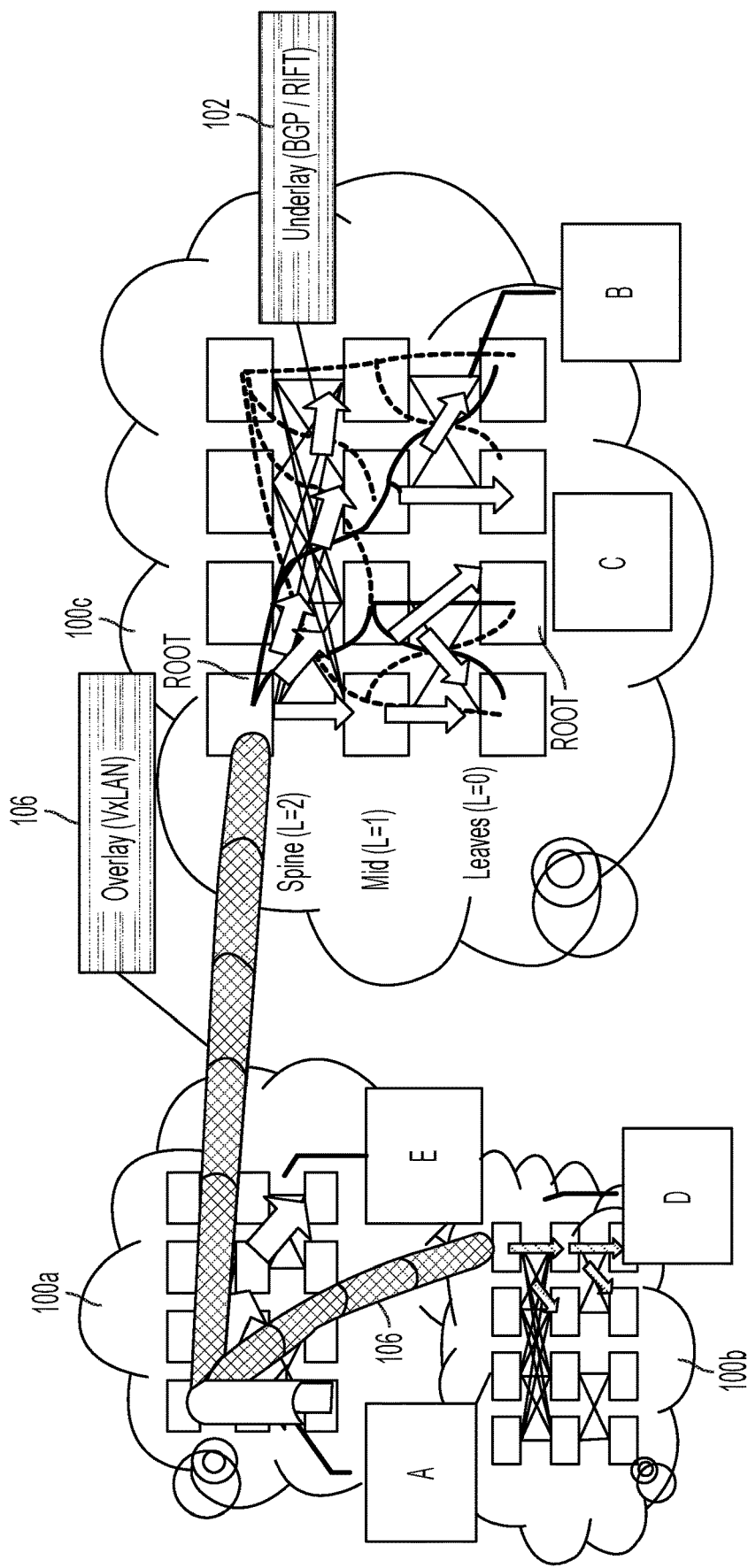
FIG. 11 illustrates a network device in the fat tree topology operable as a VxLAN endpoint for VxLAN that forms an overlay tree topology with other underlay network fabrics having respective network topologies.

FIG. 11 illustrates a network topology constructed so as to extend an overlay as a tree that joins the roots in multiple fat trees 100a, 100b, and 100c and enables cloud interconnection. If there are more than one tree (e.g., a distributed fabric) then as illustrated in FIG. 11 the VxLAN is point to multipoint, ending at the roots of each tree, e.g., it is a collection of classical VxLANs and the ingress makes a copy on each one. According to example embodiments, an underlay distribution system is leveraged at the exit edge of the overlay. A cloud structure is deployed using one or more physical data centers based on a distribution of underlay fabrics. The underlay may be Layer 2, but Layer-3 can be used with E-BGP, BGP-LS and RIFT (and/or the RIFT proposal). The overlay may be controlled, for example, using SDN or LISP, and/or VxLAN as an example of encapsulation. In one embodiments, the VxLAN endpoints can be found using a SISF function snooping protocol. Using Cisco® Software-Defined Access (SDA) (commercially available from Cisco Systems, San Jose, Calif.), endpoint network devices ("endpoints") can be found by the SISF function snooping protocols like ARP and IPv6 ND, and LISP is used as mapper/resolver. Unicast IP packets are encapsulated between the ingress switch and the egress switch. This model as illustrated in FIG. 11 is expected to eliminate the need of supporting broadcast in the system. In effect, this solves most situations, but does not provide a broadcast/multicast operation. The question becomes how to support multicast and broadcast.

FIG. 11 illustrates how the roots of the underlay trees can be interconnected using an overlay technology, to continue the multicast across the intercloud. The roots of trees in different fabrics are meshed in the overlay, typically forming a tree, but also possibly a more connected mesh with a spanning tree inside for the operation described below.

In the example of FIG. 11, a multicast packet is injected by Node A using a VxLAN to the root in its local fabric. Using the local underlay, the root sends the packet to local node E that subscribed to the multicast. Nodes B, C, and D in other remote fabrics also subscribed to A's multicast flow.

In one embodiment, the roots of the multicast trees in the corresponding fat trees synchronize a database of listeners. This can be done by classical flooding/link state sync along the overlay of the roots. This way, Root in Node A's tree knows that it needs to send the multicast packet to the other roots. The multicast packet is encapsulated across the overlay.

The receiving root de-capsulates the overlay tunnel as the root in A's fat tree did, and distributes locally. If needed, it also propagates along the overlay multicast tree, excluding the tunnel from which it got the packet.

Hence, redundant trees can extend the overlay and the underlay.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
 identifying within a network topology, by an apparatus, a plurality of network devices; and
 establishing by the apparatus, a multiple tree topology comprising a first multicast tree and a second multicast tree, the first and second multicast trees operable as redundant trees for multicast traffic in the network topology, the establishing including:
 allocating a first of the network devices as a corresponding root of the first multicast tree, allocating a first group of intermediate devices from the network devices as first forwarding devices in the first multicast tree, allocating a second group of intermediate devices as belonging to first leaf devices in the first multicast tree, and allocating terminal devices of the network devices as belonging to the first leaf devices, and
 allocating a second of the network devices as the corresponding root of the second multicast tree, allocating the second group of intermediate devices as second forwarding devices in the second multicast tree, allocating the first group of intermediate devices as belonging to second leaf devices in the second multicast tree, and allocating the terminal devices as belonging to the second leaf devices.

2. The method of claim 1, wherein:
 the network devices are connected in the network topology according to fat tree topology comprising a top-of-fabric layer comprising the first and second network devices, an intermediate layer comprising the intermediate devices, and a terminal layer of the terminal devices;
 each of the intermediate devices is coupled to each of the first and second network devices in the top-of-fabric layer, and each terminal device is coupled to one of the first forwarding devices in the first multicast tree and a corresponding one of the second forwarding devices in the second multicast tree.

3. The method of claim 1, wherein:
 the allocating the first group of intermediate devices as first forwarding devices in the first multicast tree includes a first of the first group of intermediate devices accepting operations as the corresponding first forwarding device;
 the allocating the first group of intermediate devices as second leaf devices in the second multicast tree includes the first of the first group of intermediate devices negotiating as a second leaf device in the second multicast tree.

4. The method of claim 1, further comprising allocating any one of the network devices as a virtual local area network (VLAN) endpoint for the multicast traffic based on belonging to the first and second multicast trees.

5. The method of claim 1, wherein:
 the allocating the first of the network devices as the corresponding root of the first multicast tree comprises the apparatus allocating itself as the first network device, the apparatus within a top-of-fabric layer of a fat tree topology;
 the allocating of the first group of intermediate devices comprising sending one or more data packets claiming the first group of the intermediate devices as the first forwarding devices;
 the allocating of the second group of intermediate devices as second forwarding devices in the second multicast tree based on one or more received data packets indicating the second group of intermediate devices are allocated as the second forwarding devices in the second multicast tree.

6. The method of claim 1, wherein:
 the apparatus is implemented as one of the intermediate devices or one of the terminal devices;
 the allocating including negotiating with other intermediate devices or terminal devices for formation of the first and second multicast trees, including propagating toward the first and second network devices the allocations as the roots of the first and second multicast trees, respectively.

7. The method of claim 1, wherein the multiple tree topology causes each network device to multicast a data packet, allocated among the first and second multicast trees, to each neighboring device in the first and second multicast trees except for a sourcing network device having transmitted the data packet to said each network device.

8. An apparatus implemented as a physical machine, the apparatus comprising:
non-transitory machine readable media configured for storing executable machine readable code;
a device interface circuit configured for communications in a data network; and
a processor circuit configured for executing the machine readable code, and when executing the machine readable code operable for:
identifying within a network topology of the data network a plurality of network devices; and
establishing a multiple tree topology comprising a first multicast tree and a second multicast tree, the first and second multicast trees operable as redundant trees for multicast traffic in the network topology, the establishing including:
allocating a first of the network devices as a corresponding root of the first multicast tree, allocating a first group of intermediate devices from the network devices as first forwarding devices in the first multicast tree, allocating a second group of intermediate devices as belonging to first leaf devices in the first multicast tree, and allocating terminal devices of the network devices as belonging to the first leaf devices, and
allocating a second of the network devices as the corresponding root of the second multicast tree, allocating the second group of intermediate devices as second forwarding devices in the second multicast tree, allocating the first group of intermediate devices as belonging to second leaf devices in the second multicast tree, and allocating the terminal devices as belonging to the second leaf devices.

9. The apparatus of claim 8, wherein:
the network devices are connected in the network topology according to fat tree topology comprising a top-of-fabric layer comprising the first and second network devices, an intermediate layer comprising the intermediate devices, and a terminal layer of the terminal devices;
each of the intermediate devices is coupled to each of the first and second network devices in the top-of-fabric layer, and each terminal device is coupled to one of the first forwarding devices in the first multicast tree and a corresponding one of the second forwarding devices in the second multicast tree.

10. The apparatus of claim 8, wherein:
the allocating the first group of intermediate devices as first forwarding devices in the first multicast tree includes a first of the first group of intermediate devices accepting operations as the corresponding first forwarding device;
the allocating the first group of intermediate devices as second leaf devices in the second multicast tree includes the first of the first group of intermediate devices negotiating as a second leaf device in the second multicast tree.

11. The apparatus of claim 8, wherein the processor circuit is configured for allocating any one of the network devices as a virtual local area network (VLAN) endpoint for the multicast traffic based on belonging to the first and second multicast trees.

12. The apparatus of claim 8, wherein:
the processor circuit is configured for allocating the apparatus as the first network device operating as the corresponding root of the first multicast tree, the apparatus within a top-of-fabric layer of a fat tree topology;
the processor circuit is configured for sending one or more data packets claiming the first group of the intermediate devices as the first forwarding devices;
the processor circuit is configured for allocating the second group of intermediate devices as second forwarding devices in the second multicast tree based on one or more received data packets indicating the second group of intermediate devices are allocated as the second forwarding devices in the second multicast tree.

13. The apparatus of claim 8, wherein:
the apparatus is implemented as one of the intermediate devices or one of the terminal devices;
the processor circuit is configured for negotiating with other intermediate devices or terminal devices for formation of the first and second multicast trees, including propagating toward the first and second network devices the allocations as the roots of the first and second multicast trees, respectively.

14. The apparatus of claim 8, wherein the multiple tree topology causes each network device to multicast a data packet, allocated among the first and second multicast trees, to each neighboring device in the first and second multicast trees except for a sourcing network device having transmitted the data packet to said each network device.

15. One or more non-transitory tangible media encoded with logic for execution by a machine and when executed by the machine operable for:
identifying within a network topology, by the machine, a plurality of network devices; and
establishing by the machine, a multiple tree topology comprising a first multicast tree and a second multicast tree, the first and second multicast trees operable as redundant trees for multicast traffic in the network topology, the establishing including:
allocating a first of the network devices as a corresponding root of the first multicast tree, allocating a first group of intermediate devices from the network devices as first forwarding devices in the first multicast tree, allocating a second group of intermediate devices as belonging to first leaf devices in the first multicast tree, and allocating terminal devices of the network devices as belonging to the first leaf devices, and
allocating a second of the network devices as the corresponding root of the second multicast tree, allocating the second group of intermediate devices as second forwarding devices in the second multicast tree, allocating the first group of intermediate devices as belonging to second leaf devices in the second multicast tree, and allocating the terminal devices as belonging to the second leaf devices.

16. The one or more non-transitory tangible media of claim 15, wherein:
the network devices are connected in the network topology according to fat tree topology comprising a top-of-fabric layer comprising the first and second network devices, an intermediate layer comprising the intermediate devices, and a terminal layer of the terminal devices;

each of the intermediate devices is coupled to each of the first and second network devices in the top-of-fabric layer, and each terminal device is coupled to one of the first forwarding devices in the first multicast tree and a corresponding one of the second forwarding devices in the second multicast tree.

17. The one or more non-transitory tangible media of claim 15, wherein:

the allocating the first group of intermediate devices as first forwarding devices in the first multicast tree includes a first of the first group of intermediate devices accepting operations as the corresponding first forwarding device;

the allocating the first group of intermediate devices as second leaf devices in the second multicast tree includes the first of the first group of intermediate devices negotiating as a second leaf device in the second multicast tree.

18. The one or more non-transitory tangible media of claim 15, further operable for allocating any one of the network devices as a virtual local area network (VLAN) endpoint for the multicast traffic based on belonging to the first and second multicast trees.

19. The one or more non-transitory tangible media of claim 15, wherein:

the allocating the first of the network devices as the corresponding root of the first multicast tree comprises the machine allocating itself as the first network device, the machine within a top-of-fabric layer of a fat tree topology;

the allocating of the first group of intermediate devices comprising sending one or more data packets claiming the first group of the intermediate devices as the first forwarding devices;

the allocating of the second group of intermediate devices as second forwarding devices in the second multicast tree based on one or more received data packets indicating the second group of intermediate devices are allocated as the second forwarding devices in the second multicast tree.

20. The one or more non-transitory tangible media of claim 15, wherein the multiple tree topology causes each network device to multicast a data packet, allocated among the first and second multicast trees, to each neighboring device in the first and second multicast trees except for a sourcing network device having transmitted the data packet to said each network device.

* * * * *